United States Patent [19]

McFarland

[11] E Patent Number: Re. 32,050

[45] **Reissued Date of Patent:* Dec. 17, 1985**

[54] PROCESS FOR DE-BONING MEAT OR FISH

[75] Inventor: Archie R. McFarland, Salt Lake County, Utah

[73] Assignee: Beehive Machinery, Inc., Salt Lake City, Utah

[ * ] Notice: The portion of the term of this patent subsequent to Jun. 26, 1990 has been disclaimed.

[21] Appl. No.: 277,082

[22] Filed: Jun. 25, 1981

Related U.S. Patent Documents

Reissue of:

[64] Patent No.: 3,906,118
Issued: Sep. 16, 1975
Appl. No.: 368,190
Filed: Jun. 8, 1973

U.S. Applications:

[63] Continuation of Ser. No. 129,395, Mar. 11, 1980, abandoned, which is a continuation of Ser. No. 881,686, Dec. 3, 1969, Pat. No. 3,739,994, which is a continuation-in-part of Ser. No. 593,532, Nov. 10, 1966, abandoned.

[51] Int. Cl.[4] ..... A23L 1/31; A23L 1/325

[52] U.S. Cl. ..... 426/479; 426/480; 426/518

[58] Field of Search ..... 426/55, 59, 479, 480, 426/518, 641, 643, 646, 513, 516; 17/1 G, 45, 46; 99/538, 539, 567; 241/29, 24, 94, 79, 82.1, 82.3, 82.5, 95; 209/247, 262, 300; 100/37, 39, 41, 98 R, 145, 117

[56] References Cited

U.S. PATENT DOCUMENTS

| | | | |
|---|---|---|---|
| Re. 21,449 | 5/1940 | McNitt | 100/43 |
| 2,109,398 | 2/1938 | McNitt | 100/43 |
| 2,322,791 | 6/1943 | DeBack | 100/43 |
| 2,775,191 | 12/1956 | Youd | 100/148 |
| 3,028,243 | 4/1962 | Robertson et al. | 426/480 |
| 3,098,014 | 7/1963 | Denton et al. | 17/1 G X |
| 3,112,203 | 11/1963 | Watt | 426/59 |
| 3,248,752 | 5/1966 | Segur et al. | 17/46 |
| 3,266,543 | 8/1966 | Paoli | 241/24 X |
| 3,396,768 | 8/1968 | Kurihara | 241/24 |

FOREIGN PATENT DOCUMENTS

| | | |
|---|---|---|
| 185053 | 3/1956 | Austria . |
| 592399 | 1/1934 | Fed. Rep. of Germany . |
| 99455 | of 1932 | Japan . |
| 5679 | of 1956 | Japan . |
| 5757 | of 1965 | Japan . |

OTHER PUBLICATIONS

Meat Industry, USSR 1961, No. 2, pp. 8-9.

*Primary Examiner*—Arthur L. Corbin

*Attorney, Agent, or Firm*—Burmeister, York, Palmatier, Hamby & Jones

[57] ABSTRACT

Material obtained from animals, poultry, or fish and containing edible flesh along with normally inedible relatively hard or tough components, such as bone, gristle, tendons, etc., is fed in ground condition into one end of a perforated conduit that has a conveyor screw therein which progressively decreases in conveying capacity from the feed end of the conduit to an imperforate discharge end thereof. Such inedible components are compacted within the imperforate discharge end of the conduit by an extension of the conveyor screw prior to discharge following build-up and conveyance along the interior surface of the perforate portion of the conduit as a filter mat through which edible flesh is forced toward and through the perforations of the conduit to provide a substantially bonefree edible product. The discharge passage surrounding the extension of the conveyor screw can be varied in size, preferably by a tapered ring that is movable back and forth axially of the conveyor screw extension, and preferably the spacing between conveyor screw and conduit is variable. The forward faces of the conveyor screw flights are preferably concave to provide a forwardly projecting circumferential overhang that tends to keep particles of bone near the axis of the screw, and the conduit wall thickness is unusually thick so as to withstand high pressures. Unusually high production rates can be obtained by feeding finely ground material into the conduit by means of a high pressure pump. The discharged and normally inedible components can be slurried in a digestant liquid and the digested material recovered as a food product by the application of centrifugal force. In instances where some minute particles of bone are discharged with the fleshy components, they can be homogenized by subjecting such [flesh] *fleshy* components to an attrition operation.

7 Claims, 14 Drawing Figures

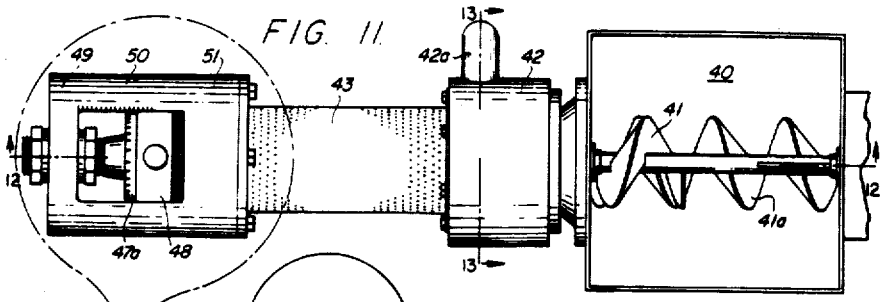
FIG. 11
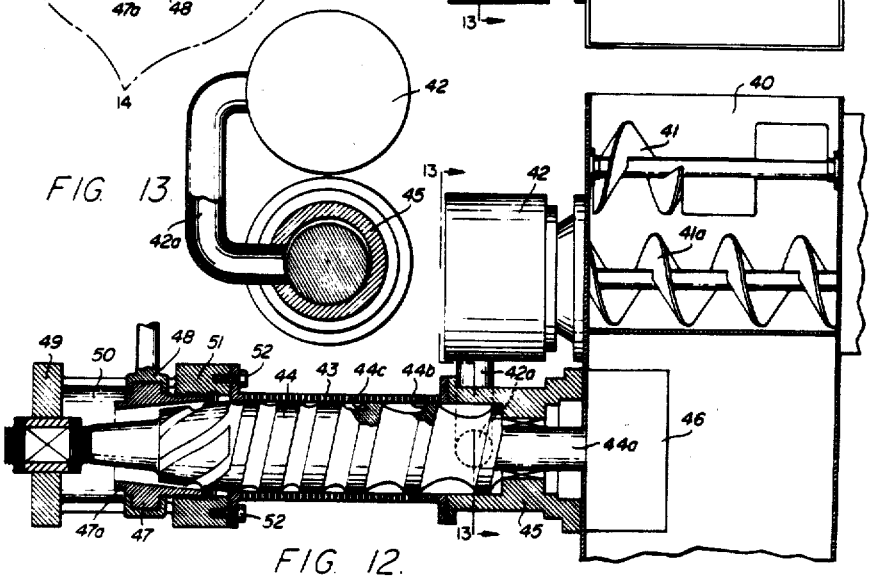
FIG. 13
FIG. 12
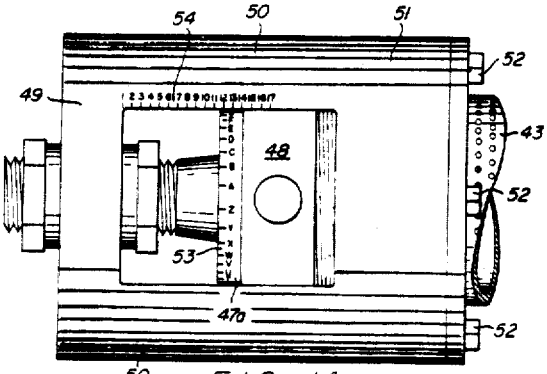
FIG 14

PROCESS FOR DE-BONING MEAT OR FISH

Matter enclosed in heavy brackets [ ] appears in the original patent but forms no part of this reissue specification; matter printed in italics indicates the additions made by reissue.

RELATED APPLICATIONS

The present *reissue* application is a continuation *of my reissue application, Serial No. 129,395, filed Mar. 11, 1980, now abandoned, to reissue my patent No. 3,906,118, granted Sept. 16, 1975, upon my application Serial No. 368,190, filed June 8, 1973, which was a continuation* of my allowed copending application Ser. No. 881,686 filed Dec., 3, 1969 (now U.S. Pat. No. 3,739,994), which [is] *was* itself a continuation-in-part of my application Ser. No. 593,532, filed Nov. 10, 1966, now abandoned.

BACKGROUND OF THE INVENTION

1. Field

This invention relates to de-boning procedures and equipment that involve preliminary grinding of meat materials from which normally inedible [boney] *bony* materials, herein defined as bones, gristle, connective tissue, and the like, have not been removed.

2. State of the Art

There are various parts of the bodies of fowl, animals, and fish, used for food, that contain excessive amounts of bone or other [boney] *bony* material—for example, the necks and backs of poultry—and yet contain sufficient meat, i.e. relatively soft, fleshy matter, to constitute a potential source of food if the [boney] *bony* matter could be economically eliminated. Moreover, there is a large commercial market for meat proteins in slurry form as supplements for ground hamburger meat, sausage meat, etc. The poultry industry, particularly, is in need of an effective way to de-bone whole turkey and chicken carcasses, as well as inferior parts thereof, such as the necks and backs, in order to receive maximum returns from flocks raised for the domestic market.

Various ways of separating [boney] *bony* components from the fleshy meat components of ground meat materials have been tried with indifferent success. Generally speaking, the processes employed have not been sufficiently positive in removing particles of bone to produce a dependable and commercially acceptable product, even though grinding the bones with the meat has posed an attractive way of quickly and easily handling the bone along with the meat and has opened up an added source of food in the form of recoverable bone marrow.

BRIEF SUMMARY OF THE INVENTION

In accordance with this invention, substantially complete elimination of [boney] *bony* components of meat materials is possible, with a high degree of meat recovery. A somewhat higher degree of edible protein recovery is also possible at the sacrifice of substantially complete elimination of [boney] *bony* materials during the de-boning stage of the overall process, but without destroying utility of a final commercial meat product obtainable by such overall process of the invention.

An outstanding feature of the invention is the forming of a filter mat of the relatively hard or tough [boney] *bony* components of ground carcasses or parts thereof of animals, poultry, and fish and the squeezing of the relatively soft, fleshy, edible parts, e.g. flesh, fat, skin, etc., through such mat. Beyond a certain point, which varies from one material to another and from particular batch to particular batch, the more pressure applied to the ground material during the squeezing process, the more of the gristle and connective tissue components, e.g. tendons and ligaments, that pass through the mat, and, as higher pressures are reached, appreciable amounts of bone particles may even escape. For some of the final meat products obtainable by the overall process of this invention, it is practical to approach such higher pressures to obtain maximum edible protein recovery, and to further process the resulting substantially boneless product to render harmless those relatively few bone particles that do come through.

The best form of apparatus presently developed for performing the de-boning phase of the overall process is an extrusion machine that comprises a perforated conduit of sufficient strength to withstand the pressures involved, and a coacting, compression type of conveyor screw for applying the required pressure while transporting the ground carcass material through the conduit.

An annular valve at the discharge end of the conduit enables the pressure exerted on the material to be varied as may be required to produce a given de-boned product. The conveyor screw should fit snugly but not tightly in the conduit, so as to convey material—including the filter mat—in a continuous spiral flow, without forcing particles of bone and other [boney] *bony* components through the perforations, except when higher pressures are being purposely employed to increase edible protein yield.

In smaller versions of the apparatus, a meat grinder is built into the extrusion machine, such grinder comprising a hopper, a feed screw arranged as an advance extension of the compression screw, so as to discharge material into the feed end of the perforated conduit through a rotary-knife-and-extrusion-plate type of cutter unit that is interposed between feed and compression screws, and power means for operating the feed screws, the rotary knife, and the compression screw as a unit. It has been found that other versions can advantageously employ a pump, usually high pressure, for feeding finely ground materials into the conduit.

In the operation of the extrusion machine, a spiral, fibrous mat of [boney] *bony* components immediately commences to build up against the inner wall of the perforated conduit by reason of the pressure that tends to force the material outwardly toward such wall, and such pressure causes the soft edible constituents of the ground carcass material to filter through the mat and out through the perforations which it covers. The filter mat becomes thicker and thicker along the length of the compression screw until it is carried out the discharge end of the conduit by such screw.

It should be noted that a snug rather than tight fit (about four one-thousandths of an inch clearance) of the compression screw in the perforated conduit is advantageous to permit a thin, fibrous coating to build up and remain over inner wall portions of the conduit that are wiped by the flights of such screw.

In instances where higher pressures are utilized to the extent that analysis of the product for undigestible matter (on the basis of human digestion) shows from about 0.05 to about 5.0% [boney] *bony* material content, the deboned product should be treated by [attrixion] *attrition* homogenization, for example, in a colloid mill, to break down the [boney] *bony* material and render it not only harmless but nutritious as well. The product obtained from the de-boning stage of the overall process is peculiarly susceptible to attrition homogenization in a colloid mill and produces a uniquely stable emulsion that can withstand extremes of temperature without chemical breakdown.

A further recovery of edible matter can be obtained from the [boney] *bony* waste material extruded through the discharge valve of the machine by slurrying such [boney] *bony* waste material with an aqueous solution of a [protolytic] *proteolytic* enzyme, an edible acid solution, or some other type of protein digestant solution and by thereafter passing the slurry through a centrifugal extractor.

Although I have found that the de-boning extrusion machine of this invention has some features in common with a certain type of juice extractor for fruits and vegetables, such as is shown by U.S. Pat. Nos. 2,119,972, 2,345,683, and 2,513,974, there are significant differences that adapt such features to the purposes of the present de-boning process.

THE DRAWINGS

There are shown in the accompanying drawings specific embodiments of machines representing what is presently regarded as the best mode of carrying out the de-boning phase of the overall process of the invention, along with a flow sheet representing what is presently regarded as the best mode of carrying out such overall process. From the detailed description of these, other more specific objects and features of the invention will become apparent.

In the drawings:

FIG. 1 represents a top plan view of a relatively small capacity machine of the invention incorporating a meat grinder with the de-boning extrusion machine;

FIG. 2, a longitudinal axial section taken on the line 2—2 of FIG. 1;

FIG. 3, a transverse vertical section taken on the line 3—3 of FIG. 1;

FIGS. 4, 5, 6, and 7, similar sections taken on the lines 4—4, 5—5, 6—6, and 7—7, respectively, of FIG. 1;

FIG. 8, a fragmentary portion of FIG. 1 drawn to a larger scale and showing an alternative arrangement;

FIG. 9, a transverse section taken on the line 9—9 of FIG. 8;

FIG. 10, a flow sheet showing a typical series of steps in the overall process of the invention;

FIG. 11, a view corresponding to that of FIG. 1, but illustrating a machine that includes a pump for feeding finely ground meat materials to the de-boning portions of the machine and various other structural modifications;

FIG. 12, a view corresponding to that of FIG. 2, but illustrating the machine of FIG. 11 and showing a somewhat different construction for the screw flights in fragmentary, longitudinal, vertical section;

FIG. 13, a transverse vertical section taken along the lines 13—13 of FIG. 11 and of FIG. 12, respectively; and FIG. 14, the left hand portion of FIG. 11 enlarged to show correlated scales marked on the adjustable discharge valve and longitudinally extending, and adjacent, stationary structure, respectively.

DETAILED DESCRIPTION OF ILLUSTRATED EMBODIMENTS

Figure 1:
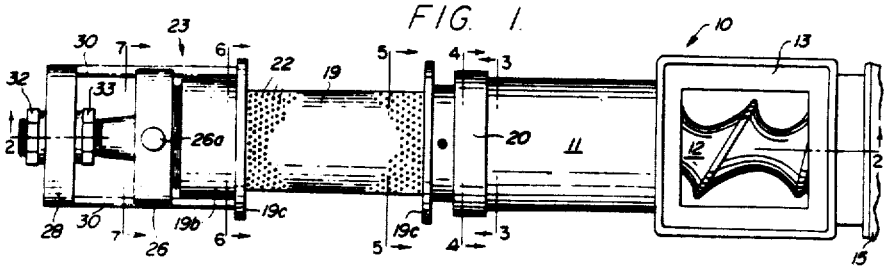

In the small machine illustrated in FIGS. 1-7, a meat grinder 10 of generally conventional type is combined with the de-boning extrusion machine of the invention. It comprises a tube 11 having a conveying screw 12 therein for receiving from hopper 13 the carcass material to be de-boned and feeding it, through grinding mechanism, to the de-boning mechanism.

One end of the screw 12 is formed as a shaft 12a, and extends through a bearing 14 to connection with suitable drive means, such as a gear box 15 powered by an electric motor (not shown). The other or discharge end of the screw 12 connects in mated, separable, drive relationship with a stub shaft 16a, FIG. 4, at the feed end of a second conveyor screw 16 of compression type. Such stub shaft 16a extends through and is journaled by a perforated cutter plate 17 that forms part of the grinding mechanism. Beyond this, such stub shaft is square in cross-section, see FIG. 3, for mating with the discharge end of screw 12. Fitted on such square portion of the stub shaft 16a, immediately in advance of the cutter plate 17 and bearing against the forward face thereof in shearing relationship therewith, is a multi-bladed knife 18 that rotates with the screws 12 and 16 and serves to cut or grind material passing from the discharge end of feed screw 12 into the receiving end of compression screw 16.

Compression screw 16 is preferably snugly but not tightly fitted into the separation chamber defined by and within a perforated conduit 19 of circular cross-section. Such conduit has a receiving end 19a that is preferably demountably connected, as by means of a threaded coupling 20, with the discharge end of feed tube 11, and has an imperforate discharge end 19b that is telescopically connected, as by the screw threads shown, with the receiving end 21a of an imperforate, open-ended, tapered, discharge ring 21 that forms part of a discharge valve arrangement.

Conduit 19 is preferably perforated about its complete circumference and longitudinally a distance covering several convolutions of the screw 16. Its wall is heavy enough to withstand the considerable pressure employed during the de-boning operation. For a conduit made from AD150 grade stainless steel, specially hardened by heat treatment to withstand severe abrasive forces, and having a perforated area three inches in length (5000 uniformly spaced holes each 40/1000 of an inch in diameter) and tapering from an inside diameter of three and one-half inches at the feed end to three and five sixteenths inches at the discharge end, a wall thickness of one-quarter of an inch has been found satisfactory under all conditions of use. Generally speaking, a wall thickness less than one-eighth of an inch is too light, while more than one-quarter of an inch is uneconomical for any of the [embodiment apparatus] *embodiments* of the invention. Circumferential flanges 19c are preferably provided at opposite ends, respectively, of the perforated area as guides for the extruded meat product.

Both conduit 19 and its coacting compression screw 16 are preferably tapered from feed end to discharge end, as just indicated, to provide for positioned adjustment of such screw in the conduit to compensate for wear and to provide variations in spacing from conduit wall surface as may be desired. The taper may be slight, e.g. from 5 to 10%, or may be great so that the configuration is more conical than it is cylindrical. In any event, the spiral valleys 16b between flights 16c of such screw 16 become progressively more shallow, so the screw progressively decreases in conveying capacity and acts with increasing force to press the conveyed material outwardly against the perforate wall of conduit 19.

As soon as the feed material from grinder 10 enters the smaller diameter de-boning conduit 19 in ground condition, it is pressed outwardly under moderate pressure. The material emerging from perforated cutter plate 17 into the feed end of perforated conduit 19 is under pressure, which, contrary to the case of a conveying scew (like 12) alone, without a cutter plate, is maintained within conduit 19 because of the confining nature of such cutter plate relative to back pressure within the conduit. Such pressure progressively increases as the material travels along the length of screw 16. The pressure causes fibrous [boney] *bony* material to mat, albeit thinly, at the inner wall of conudit 19 and across perforations 22 before any significant quantity of the relatively soft meat material can escape, and thereby immediately commences to filter [boney] *bony* material from such soft meat material as the latter is squeezed from the valleys 16b through the mat and thence through the perforations 22. The mat progressively increases in thickness along the length of the screw and is carried along by the screw to the discharge end of the separation chamber, where it is forced into and through the previously mentioned discharged valve arrangement 23.

Such valve arrangement comprises a tapered discharge [extrusion] *extension* 16d of compression screw 16 that projects beyond perforated conduit 19 and extends along the passage formed by the imperforate discharge end 19b of perforate conduit 19 and by the telescoped discharge ring 21. Between such elements 19b and 21 and the tapered discharge extension 16d of compression screw 16 is formed a restricted, annular, discharge passage 24, through which the final mat of [boney] *bony* material passes in discharging from the machine.

Discharge ring 21 has an interior taper that is slightly greater than the taper of discharge extension 16d of screw 16, so that, as the end 21a of the ring is screwed farther into the imperforate discharge end 19b of conduit 19, the size of the annular discharge passage 24 of valve 23 is decreased. This passage thus provides a variable restriction to flow of the mat of [boney] *bony* material circumferentially of the discharge end of conduit 19. The pressure in the separating chamber will be dependent upon the size of this discharge passage 24 as determined by the position of discharge ring 21. Thus, it is apparent that both the edible meat components and the normally inedible [boney] *bony* material components are separately extruded from the machine under the control of ring 21 serving as an adjustable discharge valve element.

Figure 2:
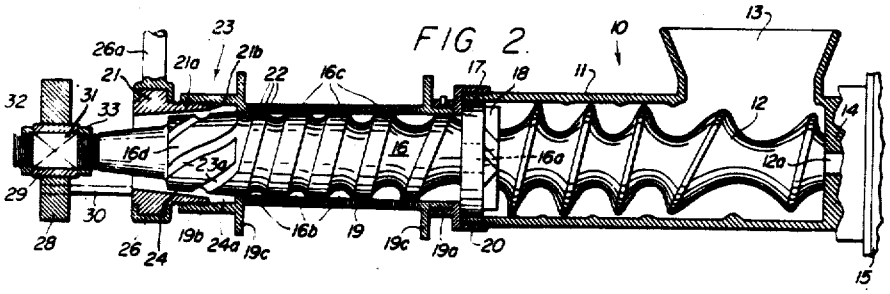
Figure 3:
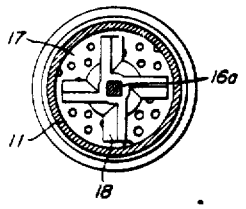
Figure 4:
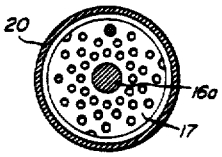
Figure 7:
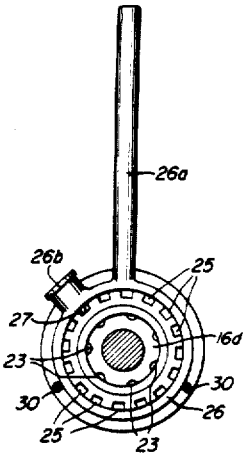
Figure 5:
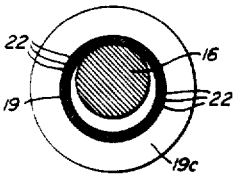
Figure 6:
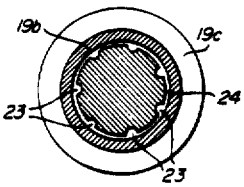

Extension 16d, as illustrated, FIG. 2, advantageously has a smooth outer face and channels 23a extending longitudinally to form screw flights and valleys therebetween for the elongate, annular, discharge passage 24 of the valve. Such passage 24, as indicated, preferably has an initial chamber portion 24a that feeds into the portion defined by the discharge ring 21 by way of an abrupt annular shoulder 21b, thereby establishing an elastic ring or choke of [boney] *bony* material in such chamber portion 24a that tends to compensate for variations in percentage of [boney] *bony* components in the material being de-boned.

A reversible ratchet is advantageously employed to screw discharge ring 21 farther into or farther out of conduit 19. For this purpose, such ring 21 is formed as a ratchet wheel with notches 25 about its exterior periphery. An operating ring 26 fits around [dicharge] *discharge* ring 21 and is rotatable relative thereto by means of a handle 26a. Resiliently biased in conventional manner within a knob member 26b of such operating ring 26 is a pawl 27. To reverse the pawl so that discharge ring 21 can be screwed in a reverse direction, it is only necessary to turn knob member 26b, as is customary in ratchet construction of this type, there being no need to go into further detail in view of the well known nature of this mechanism.

For both journaling the discharge end of compression screw 16 and enabling its position within conduit 19 to be adjusted to compensate for wear or to increase or decrease the spacing between conveyor screw and conduit, a plate 28 equipped with a central bearing 29 is rigidly supported in fixed spaced relationship with discharge ring 21 by means of pins 30 extending longitudinally from fixed securement in flange 19c of conduit 19. The discharge end of extension 16d of compression screw 16 is reduced in diameter and provided with a stub shaft extension 31, FIG. 2, having a journal portion flanked by threaded portions on which are respective adjusting nuts 32 and 33. These nuts are normally cinched tightly against bearing 29 to prevent axial movement of compression screw 16, but when wear of the flights 16c has increased the desirable tolerance between screw and conduit it is only necessary to loosen nut 33 and tighten nut 32 to effect the adjustment. This arrangement also permits such tolerance to be increased or decreased as may be desired.

Figure 8:
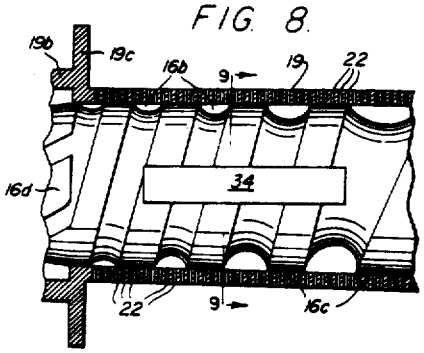
Figure 9:
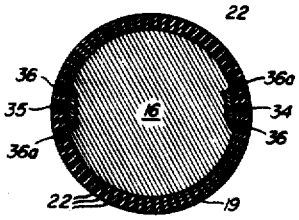

Often fleshy muscle material passing through perforations 22 of conduit 19 is fibrous and exerts a strong drag on the material being transported axially of compression screw 16 toward discharge passage 24. In order to eliminate or significantly ease this drag and so increase throughput capacity of the machine, it is sometimes advantageous to position one or more knife blades across the flights of the screw, so as to extend axially of the screw at the outer periphery of such flights. Thus, as shown in FIGS. 8 and 9, knives 34 and 35 are freely inset into receiving notches 36 in the flights 16c of the compression screw 16 of this alternative embodiment of the [debonding] machine with the back of each knife abutting the back 36a of its notch, the blade resting on the upwardly sloping bottom [36b] of the notch, and the sharp edge bearing lightly against the inner wall of the conduit 19 in shearing relationship with the edges of perforation 22. The shearing angle should be small to prevent or minimize scoring of such inner wall of conduit 19.

In operation, the knives 34 will cut the fibers that create drag, but will not destroy the filter mat that covers the perforations exposed to the valleys 16b between flights.

In this connection, attention is called to the double meat grinder of Ardrey U.S. Pat. No. 2,841,197, which has a somewhat similar construction, but is not intended nor adapted for the de-boning of meat that is ground together with [boney] *bony* components.

Figure 10:
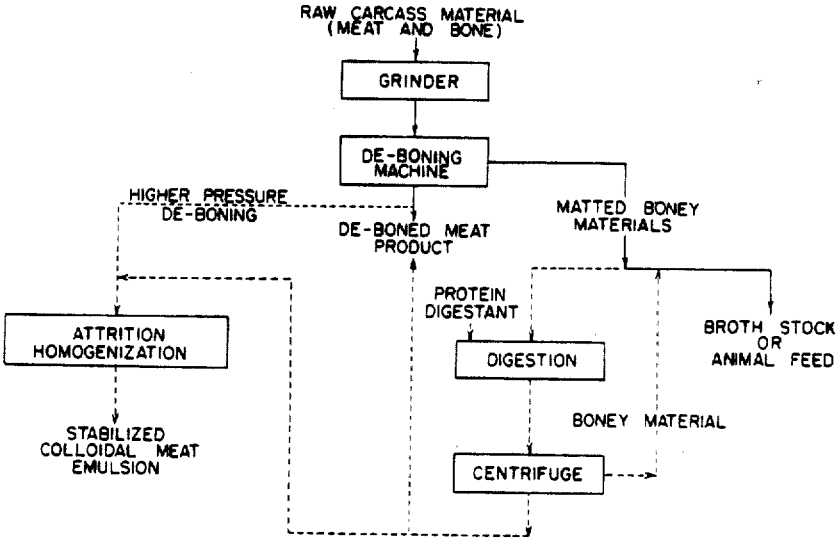

In accordance with the process of the invention as depicted diagrammatically in the flow sheet of FIG. 10, raw carcass material is ground before being fed into the de-boning machine, which separates a high proportion of the relatively soft fleshy components from the harder [boney] *bony* components. The former constitute a finished meat product; the latter, in matted form, can be used for both stock or animal feed or can be processed further, as indicated by broken lines, by digestion of protein constituents through the addition of a protein digestant and by passage through a centrifuge to eliminate undigested [boney] *bony* components.

In instances where higher de-boning pressures are used, by setting of the discharge valve of the [de-boring] *de-deboning* machine to narrow the discharge passage 24, so that more bone particles pass through the filter mat than can be tolerated in a commercial meat product, the resulting inferior meat product is passed through a colloid mill or other apparatus for effecting homogenization by attrition to produce a stabilized colloidal meat emulsion in which the bone particles have been so disintegrated as to be harmless.

It has been found that enormously increased throughput, without significant decrease in de-boning effectiveness, can be achieved by forced feed of finely ground meat or fish materials into the de-boning conduit under pressure, usually accomplished by means of a pump, and that other features to be described improve the effectiveness of the machine.

In the embodiment of FIGS. 11–14 a slurry of meat or fish material ground in standard equipment, e.g. a high extrusion type grinder whose extrusion passages are each five-sixteenths or three-eighths of an inch in diameter, is run into a hopper 40 equipped with double mixing screws 41 and 41a to keep the solids in suspension. The lower screw 41a feeds the slurry into the intake end of any suitable pump 42, for example a rotary vane, stainless steel, pet food pump as marketed by Auto Equipment Company, Astoria, Oregon, having its working parts specially hardened against bone abrasiveness. A conduit 42a conducts pump dicharge into the feed end of de-boning conduit 43, see especially FIG. 13, under pressure that may vary between about 5 to 250 lbs/sq. in., depending upon volume and character of feed and speed of rotation of the conveyor compression screw.

The conveyor compression screw 44 is similar to the corresponding screw 16 in the previous embodiments, but its stub shaft portion 44a is journaled in an imperforate entry section 45 of the perforated de-boning conduit 43 and connects with drive means 46 housed below hopper 40; also, the forward faces of its flights are made concave, as at 44b, to provide respective over hanging, forwardly facing, peripheral members 44c that tend to force fragments of boney material toward the axis of the screw. Perforated conduit 43 corresponds to conduit 19 of the previous embodiments, as do other components of the de-boning mechanism; including the [dicharge] *discharge* ring 47 and ratchet ring and handle 48 of the discharge valve. However, the compression-screw-journaling plate 49, and longitudinally extending supporting members 50, and imperforate discharge end 51 of conduit 43 are preferably made as a single casting, as shown, rather than separately as in the previous embodiments and are secured to the end of conduit 43 as by means of screw 52. Moreover, the attenuate pins of the previous embodiments have been replaced by the relatively wide members 50 to provide increased strength.

In order to enable precise adjustment of the discharge valve opening of conduit 43, a scale 53 is marked circumferentially around a rearwardly extending rim 47a of discharge ring 47 and a correlated scale 54 is marked longitudinally along one of the stationary supporting members 50.

The several new features noted for the embodiments of FIGS. 11–14 can be incorporated in the embodiments of FIGS. 1–13 if desired.

Whereas this invention is here described and illustrated with respect to certain preferred forms thereof, it is to be understood that many variations are possible without departing from the inventive concepts particularly pointed out in the claims.

I claim:

1. A process for de-boning ground meat or fish material containing soft fleshy matter and [boney] *bony* components, comprising the steps of introducing under pressure such a material into the feed end of a perforated de-boning conduit of circular cross-section and open for discharge of material at the opposite end, said conduit containing a rotary compression screw extending along its length and through the open discharge end thereof; conveying said material toward said discharge end of the conduit by means of said screw while maintaining said pressure, so as to compress said material within said conduit, whereby [boney] *bony* components are retained in and passed along said conduit as a filter mat through which soft fleshy matter is forced toward and expelled through the perforations of the conduit; *maintaining sufficient clearance between said screw and said perforated conduit to maintain a thin coating of said bony components on the inner wall portions of said conduit between said screw and said conduit;* selectively restricting [said] flow from the discharge end of the conduit circumferentially of and around the discharge end of said screw to increase the pressure within said conduit; and positively passing said filter mat through said open discharge end of said conduit circumferentially of and by means of said discharge end of the screw for discharge from the conduit.

2. A process according to claim 1, wherein the material is introduced into the conduit under pressure by means of a meat or fish grinder.

3. A process according to claim 1, wherein the material is introduced into the conduit under pressure by means of a pump.

4. A process according to claim 1, including the additional step of varying the extent of restriction of the discharge of the [boney] *bony* components from the conduit.

*5. A process for de-boning ground meat or fish material containing soft fleshy matter and bony components, comprising the steps of introducing under pressure such a material into the feed end of a perforated de-boning conduit of circular cross-section and open for discharge of material at the opposite end, said conduit containing a rotary compression screw extending along its length and through the open discharge end thereof; conveying said material toward said discharge end of the conduit by means of said screw while maintaining said pressure, so as to compress said material within said conduit, whereby bony components are retained in and passed along said conduit as a filter mat through which soft fleshy matter is forced toward and expelled through the perforations of the conduit; maintaining sufficient clearance between said screw and said perforated conduit to maintain a thin coating of said bony components on the inner wall portions of said conduit between said screw and said conduit; said coating constituting a portion of said filter mat; said clearance being maintained on the*

*order of four one-thousandths of an inch; selectively restricting flow from the discharge end of the conduit circumferentially of and around the discharge end of said screw to increase the pressure within said conduit; and positively passing said filter mat through said open discharge end of said conduit circumferentially of and by means of said discharge end of the screw for discharge from the conduit.*

*6. A process for de-boning ground meat or fish material containing soft fleshy matter and bony components, comprising the steps of introducing under pressure such a material into the feed end of a perforated de-boning conduit of circular cross-section and open for discharge of material at the opposite end, said conduit containing a rotary compression screw extending along its length and through the open discharge end thereof; conveying said material toward said discharge end of the conduit by means of said screw while maintaining said pressure, so as to compress said material within said conduit, whereby bony components are retained in and passed along said conduit as a filter mat through which soft fleshy matter is forced toward and expelled through the perforations of the conduit; maintaining sufficient clearance about four one-*thousandths of an inch between said perforated conduit and the flights of said screw to maintain a thin coating of said bony components on the inner wall portions of said conduit between said conduit and said flights of said screw; said coating constituting a portion of said filter mat; selectively restricting flow from the discharge end of the conduit circumferentially of and around the discharge end of said screw to increase the pressure within said conduit; and positively passing said filter mat through said open discharge end of said conduit circumferentially of and by means of said discharge end of the screw for discharge from the conduit.

*7. A process for de-boning ground meat or fish material containing soft fleshy matter and bony components, comprising the steps of introducing such a material under pressure between about 5 to 250 pounds per square inch into the feed end of a perforated de-boning conduit of circular cross-section and open for discharge of material at the opposite end, said conduit containing a rotary compression screw extending along its length and through the open discharge end thereof; conveying said material toward said discharge end of the conduit by means of said screw while maintaining said pressure, so as to compress said material within said conduit, whereby bony components are retained in and passed along said conduit as a filter mat through which soft fleshy matter is forced toward and expelled through the perforations of the conduit; maintaining sufficient clearance between said perforated conduit and the flights of said screw to maintain a thin coating of said bony components on the inner wall portions of said conduit between said conduit and said flights of said screw; said coating constituting a portion of said filter mat; selectively restricting flow from the discharge end of the conduit circumferentially of and around the discharge end of said screw to increase the pressure within said conduit; and positively passing said filter mat through said open discharge end of said conduit circumferentially of and by means of said discharge end of the screw for discharge from the conduit.*

* * * * *